United States Patent [19]

Goto et al.

[11] Patent Number: 5,345,291
[45] Date of Patent: Sep. 6, 1994

[54] COMPACT FOCUS DETECTING DEVICE

[75] Inventors: Hisashi Goto, Musashino; Tsuyoshi Yaji, Kawagoe, both of Japan

[73] Assignee: Olympus Optical Co., Ltd., Tokyo, Japan

[21] Appl. No.: 995,811

[22] Filed: Dec. 23, 1992

[30] Foreign Application Priority Data

Dec. 27, 1991 [JP] Japan .................. 3-346744
Jan. 21, 1992 [JP] Japan .................. 4-008481

[51] Int. Cl.⁵ .......................................... G03B 13/36
[52] U.S. Cl. .................................. 354/406; 250/201.8
[58] Field of Search ............... 354/402, 406, 407, 408; 250/201.8

[56] References Cited

U.S. PATENT DOCUMENTS 4,949,116  8/1990  Karasaki et al. ............... 354/408
4,959,677  9/1990  Suda et al. ...................... 354/402

FOREIGN PATENT DOCUMENTS 55-118019  9/1980  Japan .
58-27110   2/1983  Japan .
58-106511  6/1983  Japan .
58-178328 10/1983  Japan .
60-32012   2/1985  Japan .
63-88511   4/1988  Japan .

*Primary Examiner*—W. B. Perkey
*Attorney, Agent, or Firm*—Cushman, Darby & Cushman

[57] ABSTRACT

A focus detecting device comprising a condenser lens disposed in the vicinity of a predetermined image surface of a photographic lens system, separator lenses disposed on the side of emergence of the condenser lens and functioning to partially separate a pair of light bundles having passed through different regions respectively of the photographic lens system. The focus detecting device can use, in place of the separator lenses, a reimaging lens having reflecting surfaces which can function also as aperture stops and are formed on a plane including a center of curvature of the surface thereof. This focus detecting device can be made compact and is capable of detecting a focus point with high accuracy.

8 Claims, 11 Drawing Sheets

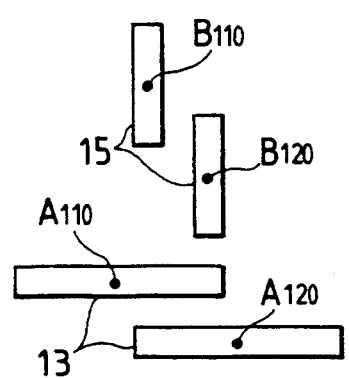
FIG. 15
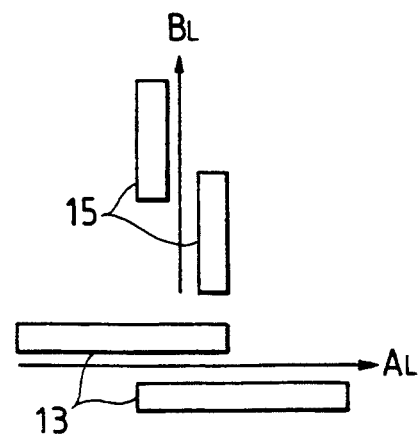
FIG. 16
FIG. 17
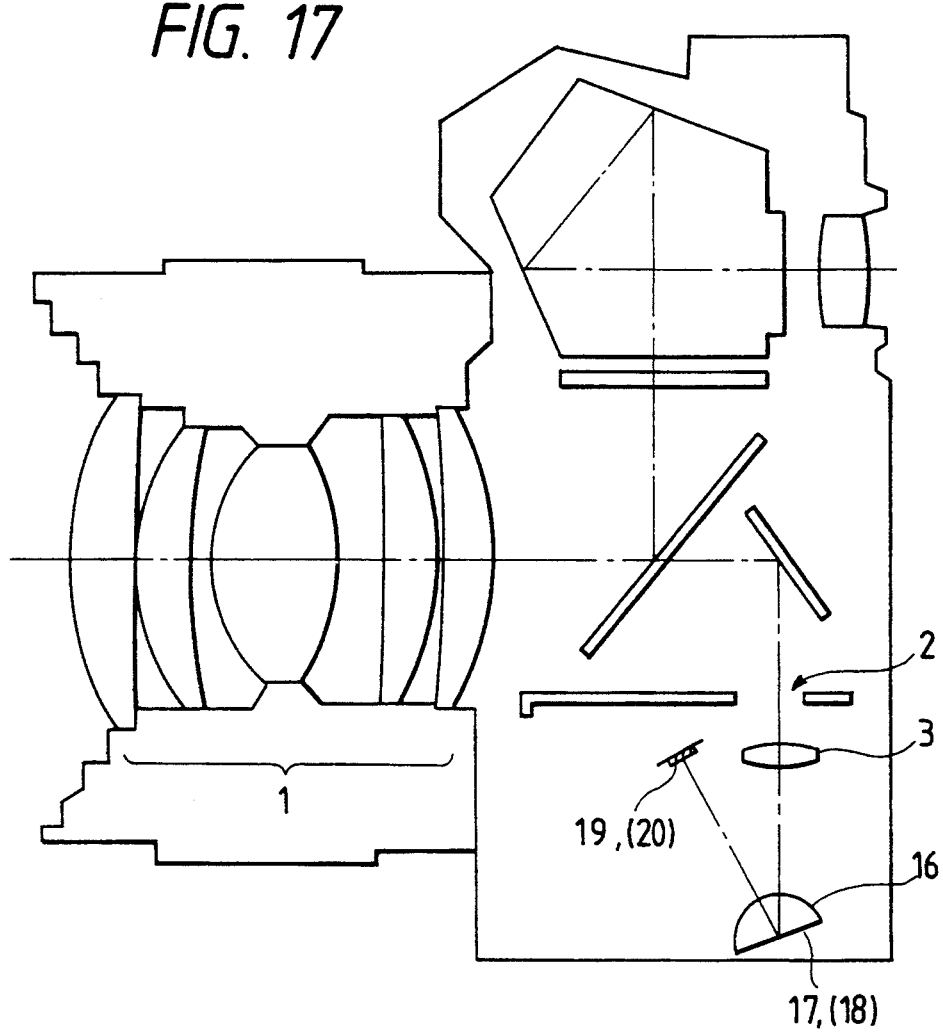

COMPACT FOCUS DETECTING DEVICE

BACKGROUND OF THE INVENTION

FIELD OF THE INVENTION

The present invention relates to a focus detecting device which utilizes a light bundle having passed through a photographic lens system, and more specifically to a focus detecting device which is used for detecting focus conditions of cameras and the like.

DESCRIPTION OF THE RELATED ART

There have conventionally been proposed, for example by Japanese Patent Preliminary Publication Nos. Sho 55-118019, Sho 58-106511 and Sho 60-B32012, a large number of focus detecting devices, each of which is configured so as to detect a focused condition by splitting a light bundle having passed through a photographic lens system into two light bundles and reimaging these two light bundles on two arrays of photoelectric converter elements by using a reimaging optical system, and detecting positional deviation between the two images. Each of these focus detecting devices comprises a condenser lens, which is disposed in the vicinity of a predetermined image surface a pair of aperture stops which are disposed after the condenser lens and have apertures arranged with a spacing sufficient for obtaining required focusing accuracy, a pair of separator lenses disposed after the pair of aperture stops respectively, a pair of optical systems respectively disposed at locations at which light bundles emerging from the separator lenses are imaged, and two arrays of photoelectric converter elements (not shown) disposed for receiving light bundles having passed through these optical systems. However, these conventional focus detecting devices cannot assure high focus detecting accuracy in a broad range of a visual field. Further, each of these conventional focus detecting devices is configured so as to detect an amount of defocus on the basis of contrast information obtained only in one direction on an object to be photographed and therefore incapable of detecting other focusing conditions on objects which have no contrast in a predetermined direction.

For solving the problems described above, there have been proposed, for example by Japanese Patent Preliminary Publication No. Sho 63-88511, focus detecting devices using a plurality of focus detecting optical systems. FIG. 1 illustrates a schematic sectional view of a single lens reflex camera which comprises such a focus detecting device disposed on a bottom thereof, FIG. 2 is a schematic sectional view illustrating the focus detecting optical system of the focus detecting device, and FIG. 3, FIG. 4 and FIG. 5 are front views of aperture stops, separator lenses and arrays of photoelectric converter elements of the focus detecting device respectively which are seen from an optical axis. This focus detecting device comprises a condenser lens 3 which is disposed in the vicinity of a predetermined image surface 2 of a photographic lens system 1, a pair of aperture stops 4 and 7 which are disposed after the condenser lens 3 and have a pair of apertures arranged with a spacing assuring required focus detecting accuracy and on lines perpendicular to each other (see FIG. 3), two separator lenses 50 and 52 which are disposed after the apertures of the aperture stops 4 and 7 for forming secondary images (see FIG. and two pairs of photoelectric converter element arrays which are disposed on lines perpendicular to each other at locations at which images of an object to be photographed are formed by the separator lenses 50 and 52 (see FIG. 5). This focus detecting device is configured so as to detect a focus condition of the photographic lens system 1 on the object to be photographed by comparing electrical signals obtained with the photoelectric converter elements 51a and 51b with those obtained by photoelectric converter elements 53a and 53b.

Focus detection is performed by detecting electrical signals proportional to brightness of images of the object to be photographed on light receiving surfaces of the photoelectric converter element arrays 51 and 53, and comparing and processing these signals. The pair of photoelectric converter element arrays 51a, 51b and 53a, 53b which compare the signals should desirably have a constant signal detecting accuracy. In the conventional example of focus detecting device described above, however, the images formed by the separator lenses on the photoelectric converter element arrays 51a, 51b, 53a, 53b are converted into electrical signals by photoelectric converter of each element and detected through transfer lines 51a, 51B, 53A and 53B which are disposed in parallel with the photoelectric converter element arrays. Consequently, the transfer lines were apt to allow to mixing of transmission noise having levels different among the transfer lines and have signal to noise or S/N ratios different among the transfer lines. In particular cases where the S/N ratios were different among the transfer lines 51A, 51B, 53A and 53B which compare the electrical signals, there was a problem in that the focus detection was erroneous, impossible or remarkably low in accuracy.

This problem can be solved by using a common transfer line in place of each of the two pairs of transfer lines 51A, 51B, 53A and 53B. From a structural viewpoint, however, the conventional disposition of the photoelectric converter element arrays could hardly allow to use a common transfer line in place of each pair of the transfer lines for each of the pairs of the photoelectric converter element arrays which were adopted for comparing the electrical signals. The conventional disposition of the photoelectric converter element arrays allowed to adopt a common transfer line only for the pair of photoelectric converter element arrays which were adjacent to each other or opposite to each other as indicated by the arrow traced by the solid line in FIG. 6A or FIG. 6B. Alternatively, the conventional common transfer line for each pair of photoelectric converter element arrays may use a lengthened transfer line as shown in FIG. 6C. However, the lengthening of the transfer line 1 lowers the S/N ratio and cannot constitute a means for enhancing focus detecting accuracy.

Further, since diameters of the light bundles to be used for focus detection are determined by the pair of aperture stops 4 and 7 in the conventional focus detecting device, the aperture stops are formed separately from the reimaging lenses so that the light bundles are imaged at predetermined locations by a pair of reimaging lenses 16 and 18. Therefore, focus detecting accuracy is largely dependent on precision of the positional relationship between the aperture stops and the reimaging lenses in the conventional focus detecting device. That is to say, it is necessary to precisely determine the spacing between the aperture stops, the spacing between the reimaging lenses, and the positional relationship between each aperture stop and each reimaging lens. However, the positional relationship between the aperture stops and the reimaging lenses is often made inaccurate due to manufacturing and assembling errors since the aperture stops and the reimaging lenses are separate members. Furthermore, optical paths are folded by using planar mirrors for logical selection of a location to be occupied by the focus detecting device or a form of the focus detecting device. Accordingly, a light bundle which is reflected by a planar mirror could not be overlapped, over a large sectional area, with a light bundle to be incident on the planar mirror when an automatic focus control system is adopted.

Moreover, a reflecting surface is formed on a reimaging lens itself as in the case of the focus detecting device disclosed by Japanese Patent Preliminary Publication No. Sho 58-27110 illustrated in FIG. 7 and FIG. 8. In this case, however, strict restrictions posed on the shape and area of the reimaging lens constitute an inconvenience to narrow design freedom. In FIG. 7 and FIG. 8, the reference numerals 54 and 59 represent field stops, the reference numerals 55, 56, 60, 61, 62 and 63 designate concave reflecting mirrors, and the reference numerals 57, 58, 62, 65, 66 and 67 denote arrays of photoelectric converter elements. In this focus detecting device, a pair of reimaging lenses must have the same shape. If the reimaging lenses have shapes different from each other, these differences will be produced in magnifications and aberrations of images, thereby degrading focus detecting accuracy. In addition, there are strict restrictions posed on the slope and area of the concave reflecting mirrors which produce aberrations in larger amounts than those of the aberrations which are produced by lenses, thereby narrowing design freedom for focus detecting devices.

Though focus detecting accuracy can be enhanced by providing data of images having higher contrast to the photoelectric converter element arrays, providing data of an image having too high resolution to the photoelectric converter element arrays produces the reverse effect that moiré is produced by high-frequency components and that focus detecting accuracy is degraded under an influence due to aliasing. Further, Japanese Patent Preliminary Publication No. Sho 58-1788328 proposed to degrade resolution on images at the focusing stage by deviating locations of the photoelectric converter element arrays. When the aliasing is suppressed by deviating the locations of the photoelectric converter element arrays as proposed by this patent, however, aliasing is produced at locations deviated from a focused location and focus detecting accuracy is degraded. In addition, there is another problem in that image contrast is degraded at the required frequency.

SUMMARY OF THE INVENTION

A primary object of the present invention is to provide a more compact focus detecting device which is capable of detecting a focus point within a broad range of a visual field and at high accuracy irrespective of the contrast of objects to be photographed.

The focus detecting device according to the present invention comprises a plurality of focus detecting optical systems which receive two light bundles having passed through different regions of a photographic lens system with two photoelectric converter means and detect a phase difference between these two light bundles from light intensity distributions on the light receiving surfaces of the photoelectric converter means, and is configured so that a light bundle incident from the photographic lens system onto one of the focus detecting optical systems in not allowed to intersect with another light bundle incident from the photographic lens system onto the other focus detecting optical system, these light bundles are allowed to overlap at least partially with each other on a predetermined image surface, and a segment traced between centers of light bundle measuring range of one of the focus detecting optical system set in focused condition does not intersect with another segment traced between centers of light bundle measuring ranges of the other focus detecting optical system set in a focused condition.

The present invention makes it possible to compose a focus detecting device which has an enlarged measuring range and an enhanced focusing accuracy and is capable of detecting a focus point irrespective of contrast of the objects to be photographed. The device uses a common signal transfer line for a pair of photoelectric converter element arrays which are adopted for comparing detected signals. Accordingly, the present invention makes it possible to shorten the signal transmission line and enhance S/N ratio in the signal transmission line.

The focus detecting device according to the present invention may alternatively comprise two focus detecting optical systems which are capable of detecting a focus point while receiving two light bundles having passed through different regions of a photographic lens system by photoelectric converter means and detecting a phase difference between output signals representing intensity distributions of the light bundles obtained from the photoelectric converter means, a group of condenser lenses disposed on a predetermined image surface of the photographic lens system, and a group of reimaging lenses and arrays of photoelectric converter elements disposed after the condenser lenses. One of the reimaging lenses is configured so that a light bundle which is incident through the condenser lens group is reflected by one of the surfaces of the reimaging lens and emerges from the other surface of the reimaging lens, and the reflecting surface of the reimaging lens is configured so as to reflect in different directions the two light bundles which have passed through the different regions of the photographic lens system.

In a preferred formation of the focus detecting device according to the present invention, the reimaging lens is configured so as to have a surface of incidence and a surface of emergence which are formed on a common continuous curved surface. Since an incident light bundle is subjected to lens functions on the surface of incidence and the surface of emergence respectively in this formation, the lens function of each of the surfaces can be weakened so as to reduce aberrations. Further, since a range to allow incidence of the light bundle can partially be overlapped with another range to allow emergence of the light bundle, it is possible to make the focus detecting device more compact and enhance the freedom for layout of the focus detecting optical systems even in a limited space of a camera body.

In another preferred formation of the focus detecting device according to the present invention, a surface of incidence and a surface of emergence of a reimaging lens having reflecting surfaces are located on a curved surface having a center of curvature or on an aspherical surface having an axis and the reflecting surfaces are located on a plane including the center of curvature of the curved surface, a center of curvature of a paraxial surface of the aspherical surface or a point located in the vicinity thereof. In this formation, an incident light bundle and a reflected light bundle are subjected to nearly the same influence due to refraction, whereby a pair of light bundles are imaged in substantially the same condition and detecting accuracy of defocus amount can be enhanced. Further, the surface of incidence and the surface of emergence of the reimaging lens can be shaped at the same time so as to reduce manufacturing errors of these surfaces, thereby enhancing focus detecting accuracy.

In still another preferred formation of the focus detecting device according to the present invention, a reflecting surface formed on a reimaging lens has a light diffusing property. Since the reimaging lens functions also as a low pass filter in this formation, it is possible to lower contrast among specific spatial frequency components which produce aliasing without lowering contrast among spatial frequency components which are required for focus detection, thereby enabling focus detection with high accuracy by suppressing aliasing.

This and other objects as well as the features and the advantages of the present invention will become apparent from the following detailed description of the preferred embodiments when taken in conjunction with the accompanying drawings.

BRIEF DESCRIPTION OF THE DRAWINGS

FIG. 15 is a diagram illustrating a disposition of photoelectric converter element arrays in the second embodiment of the present invention;

FIG. 16 is a diagram illustrating a pattern of signal transfer lines in the second embodiment of the present invention;

FIG. 17 is a schematic sectional view of a single-lens reflex camera illustrating a third embodiment of the focus detecting device according to the present invention;

DESCRIPTION OF THE PREFERRED EMBODIMENTS

Figure 1:
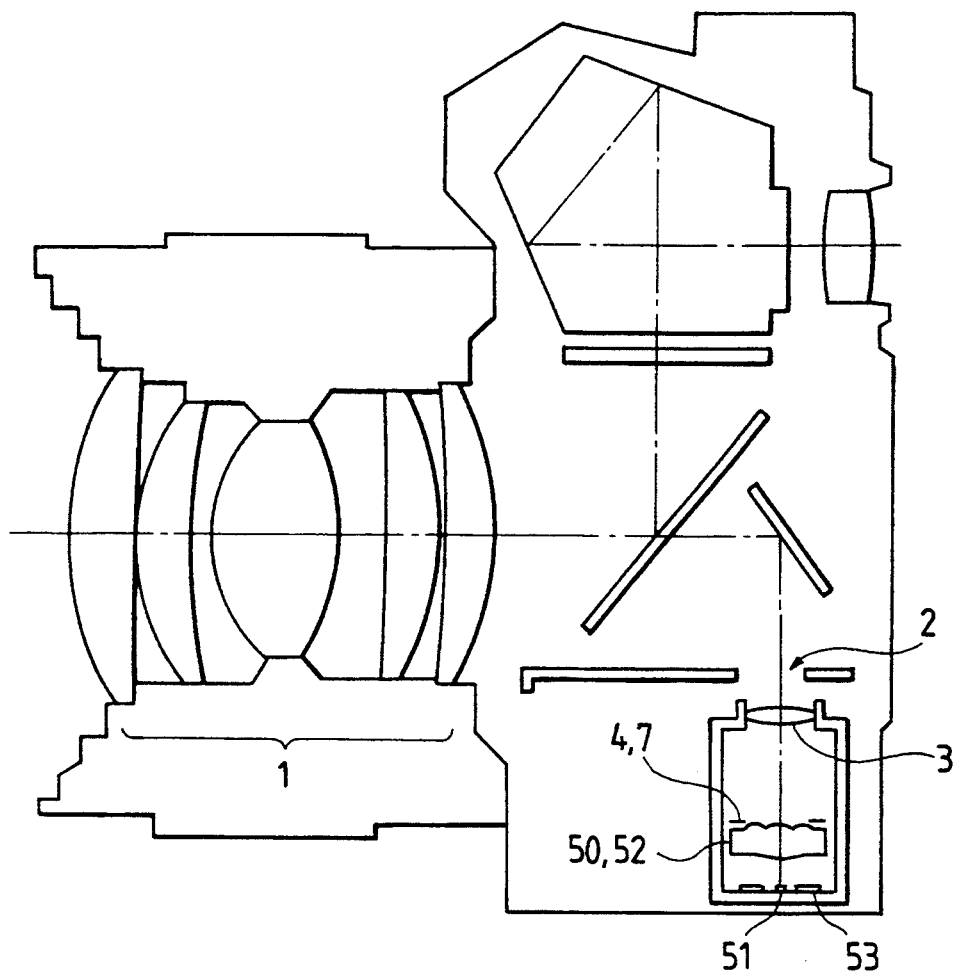
FIG. 1 is a schematic sectional view illustrating a single-lens reflex camera incorporating a conventional focus detecting device.
Figure 2:
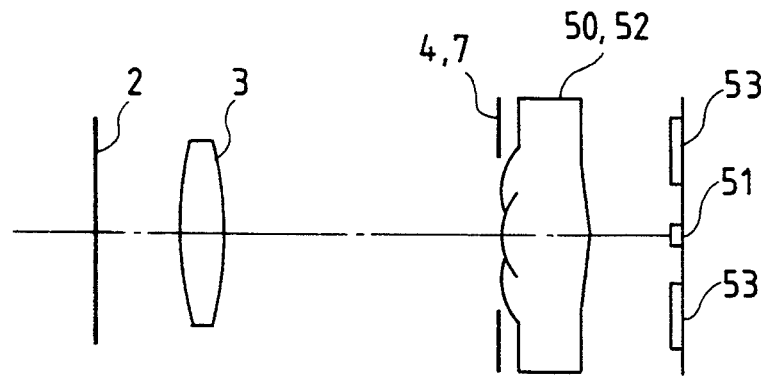
FIG. 2 is a schematic sectional view illustrating a composition of the conventional focus detecting device.
Figure 3:
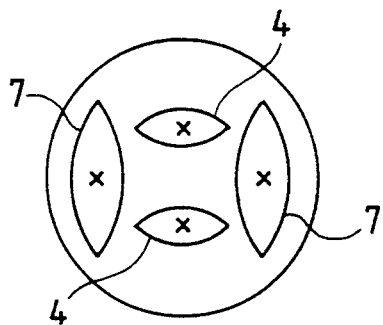
FIG. 3 is a front view illustrating aperture stops disposed in the conventional focus detecting device in a condition as seen from a point on an optical axis.
Figure 4:
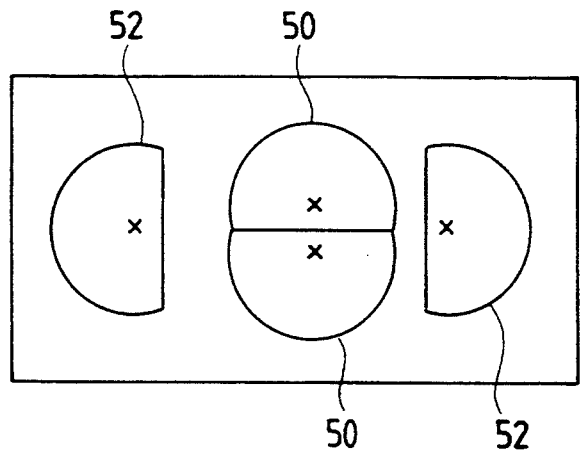
FIG. 4 is a front view illustrating separator lenses disposed in the conventional focus detecting device in a condition as seen from a point on the optical axis.
Figure 5:
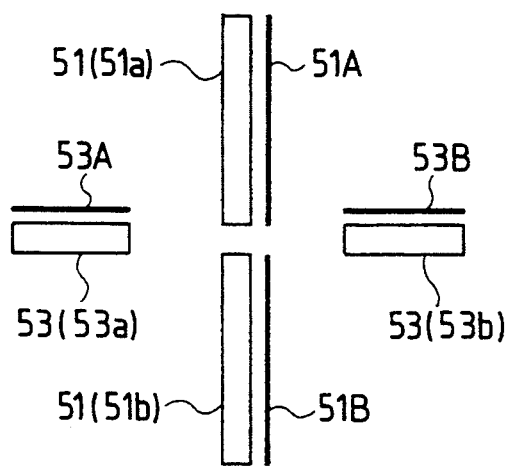
FIG. 5 is a front view of photoelectric converter element arrays disposed in the conventional focus detecting device in a condition as seen from a point on the optical axis.
Figure 6A:
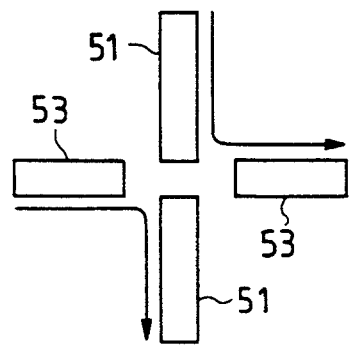
FIG. 6A, FIG. 6B and FIG. 6C are views illustrating patterns of signal transfer lines adopted for the conventional focus detecting device.
Figure 6B:
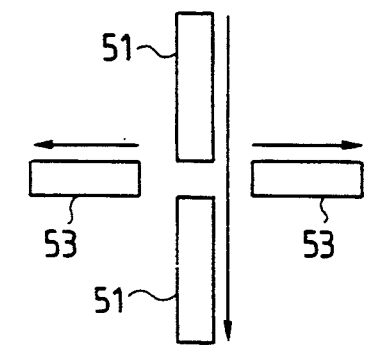
Figure 6C:
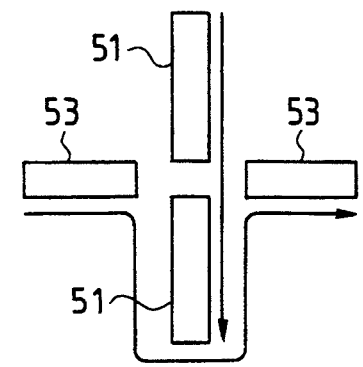
Figure 7:
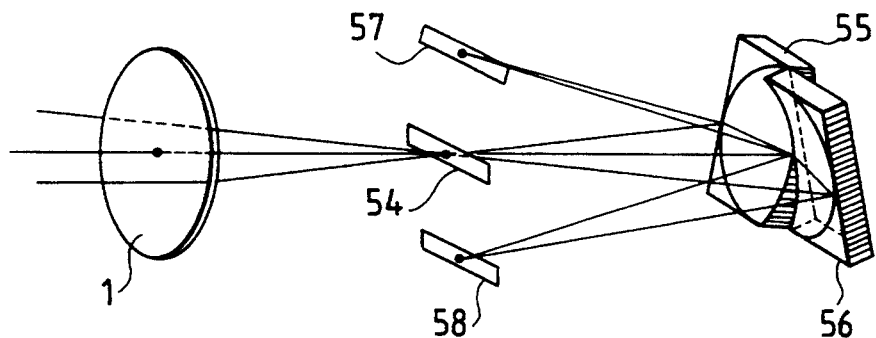
FIG. 7 is a perspective view illustrating a configuration of concave reflecting mirrors disposed in the conventional focus detecting device.
Figure 8:
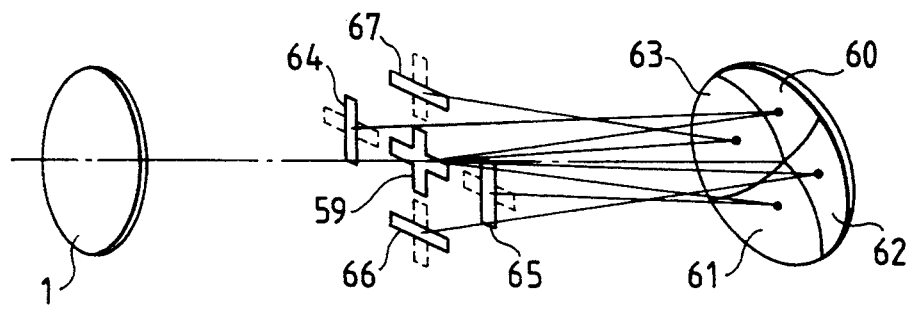
FIG. 8 is a perspective view illustrating a configuration of concave reflecting mirrors disposed in the conventional focus detecting device which is different from the configuration shown in FIG. 7.
Figure 9:
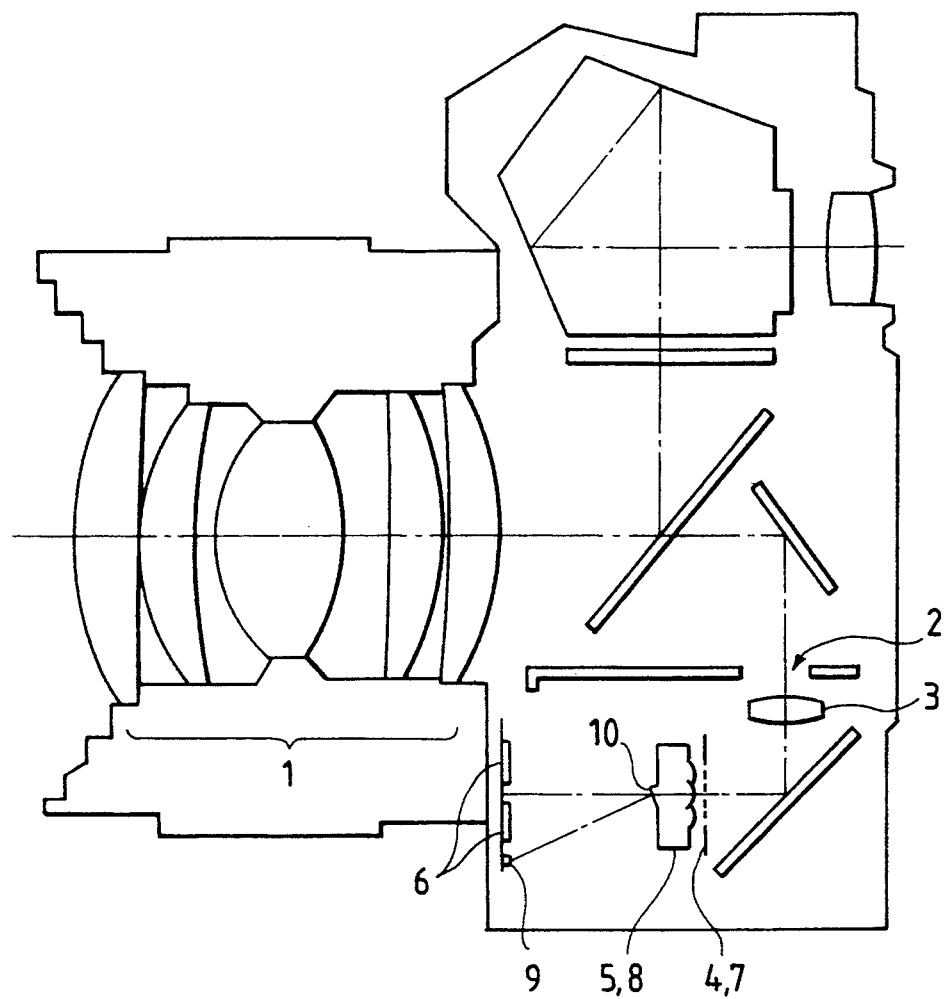
FIG. 9 is a schematic sectional view of a single-lens reflex camera illustrating a first embodiment of the focus detecting device according to the present invention.

Now, the focus detecting device according to the present invention will be described more detailedly below with reference to the preferred embodiments illustrated in the accompanying drawings using the same reference numerals as those employed for description of the prior art for elements of the focus detecting device according to the present invention which are substantially the same as those of the conventional focus detecting device.

Figure 10:
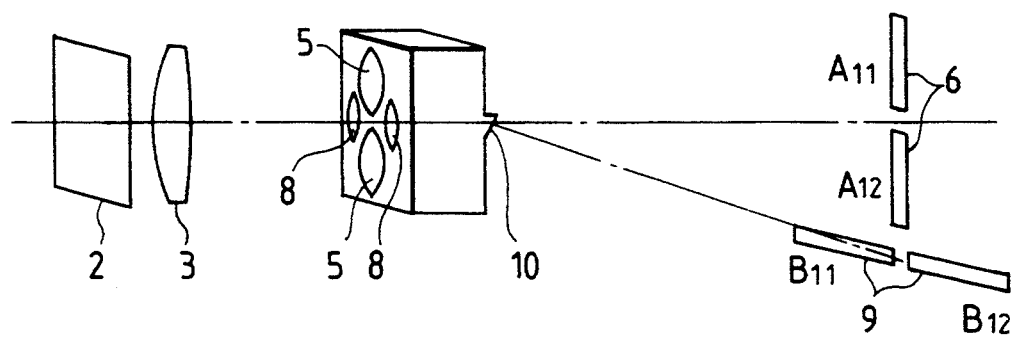
FIG. 10 is a perspective view illustrating a focus detecting optical system used in the first embodiment of the present invention.

FIG. 9 through FIG. 12 illustrate the first embodiment of the focus detecting device according to the present invention. The first embodiment comprises a focus detecting optical system (hereinafter referred to as a focus detecting optical system A) composed of a condenser lens 3 which is disposed in the vicinity of a predetermined image surface 2 of a photographic lens system 1, an aperture stop 4 having a pair of apertures disposed after the condenser lens 3 with a spacing sufficient for a required focus detecting accuracy, a pair of separator lenses 5 disposed after the apertures respectively of the aperture stop 4 and a pair of photoelectric converter element arrays 6 disposed at locations onto which light bundles emerging from the separator lenses 5 are to be imaged; and another focus detecting optical system (hereinafter referred to as a focus detecting optical system B) composed of an aperture stop having a pair of apertures which are arranged after the condenser lens 3 with a spacing sufficient for obtaining required focus detecting accuracy in a direction perpendicular to a segment traced between centers of the pair of the apertures of the aperture stop 4, a pair of separator lenses 8 which are disposed after the apertures respectively of the aperture stop 7, and a pair of photoelectric converter element arrays 9 disposed at locations at which light bundles emerging from the separator lenses 8 are to be imaged. The light bundles emerging from the separator lenses 8 have optical axes which are refracted by a prism 10 disposed on surfaces of emergence of the separator lenses 8 and has an inclined surface having a predetermined angle relative to the segment traced between the centers of the pair of apertures of the aperture stop 4 (see FIG. 10), and are imaged on the photoelectric converter element arrays 9. The photoelectric converter element arrays 6 and 9 consist of image pickup devices such as CCD's. In FIG. 10, the aperture stops 4 and 7 are omitted.

In the focus detecting optical system A, a light bundle which was incident from the photographic lens system 1 and has passed through the predetermined image surface 2 transmits through the condenser lens 3 and separator lenses 5, and forms a pair of secondary images $A_{11}$ and $A_{12}$ on the photoelectric converter element arrays 6. In the focus detecting optical system B, a light bundle which was incident from the photographic lens system 1 and has passed through the predetermined image surface 2 transmits through the condenser lens 3 and is incident on the separator lenses 8. An optical axis of this light bundle is refracted by the prism 10 disposed on the surfaces of emergence of the separator lenses 8, and the light bundle emerges from the separator lenses 8 and forms a pair of secondary images $B_{11}$ and $B_{12}$ on the photoelectric converter element arrays 9. The focus detecting device is configured so that centers $A_{11}$ O, $A_{12}$ O, $B_{11}$ O and $B_{12}$ O of these secondary images are coincident with centers of the photoelectric converter element arrays 6 and 9 as shown in FIG. 11 in a focused condition.

Figure 11:
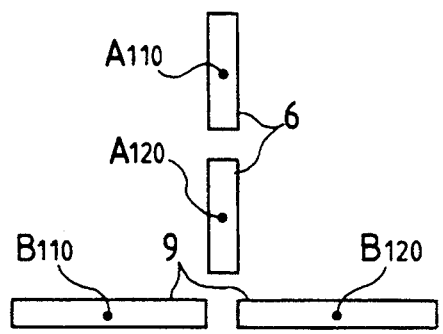
FIG. 11 is a diagram illustrating a disposition of photoelectric converter element arrays in the first embodiment of the present invention.
Figure 12:
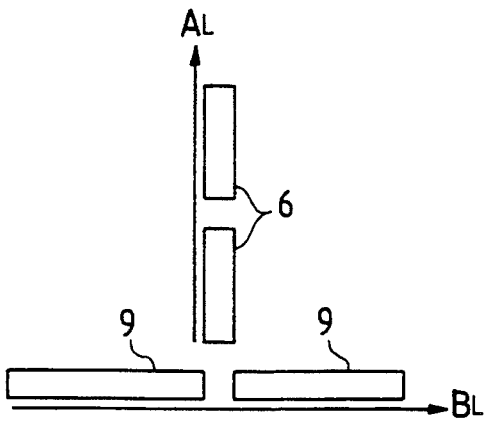
FIG. 12 is a diagram illustrating a pattern of signal transfer lines for the photoelectric converter element arrays in the first embodiment of the present invention.
Figure 13:
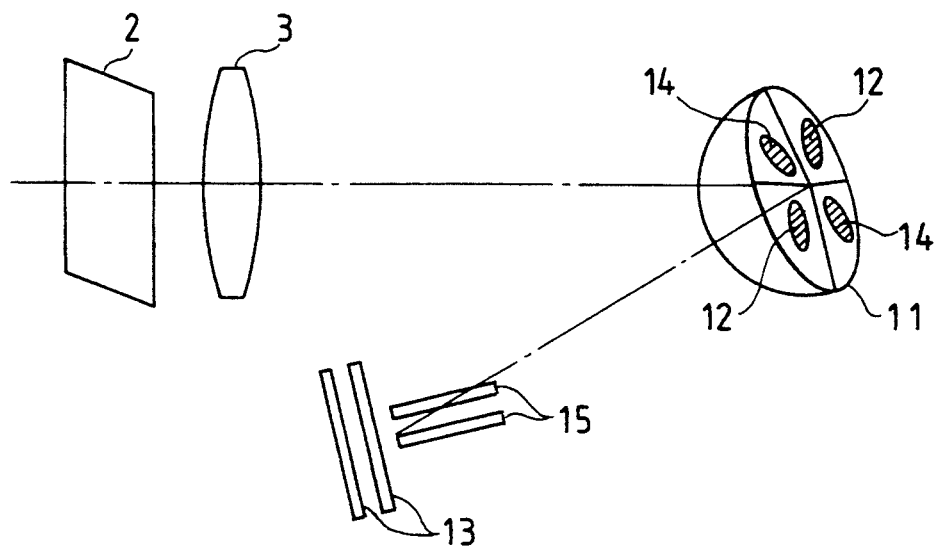
FIG. 13 is a perspective view of a focus detecting optical system adapted for a second embodiment of the present invention.
Figure 14:
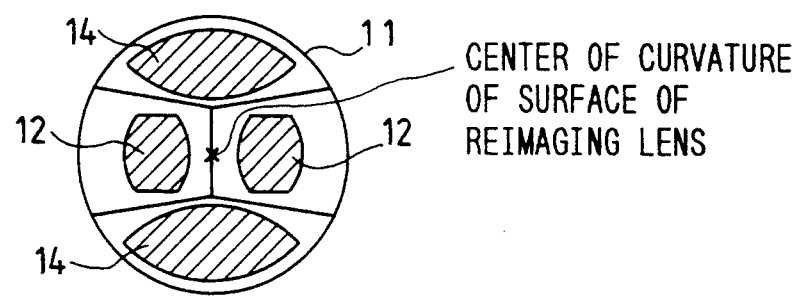
FIG. 14 is a front view illustrating reflecting surfaces of a reimaging lens used in the second embodiment of the present invention.

In the first embodiment wherein the optical axes of the light bundles are refracted by the prism 10 disposed on the surfaces of emergence of the separator lenses 8 in the focus detecting optical system B, it is possible to dispose the photoelectric converter element arrays 6 and 9 so as to form a shape of an inverted letter of T as shown in FIG. 11. In this case, the refracting function of the prism 10 produces influences on converged conditions of the light bundles. However, this influence causes no hindrance to detection of focused conditions which is performed by detecting positional deviation between these two light bundles since the refracting function of the prism 10 produces influences which are quite the same on the two light bundles having passed through the pair of apertures of the aperture stop 7. Out of the electrical signals provided from the photoelectric converter element arrays 6 and 9, the signals detected by the focus detecting optical system A can be detected through a common transfer line indicated by the arrow AL in FIG. 12 and the signals detected by the focus detecting optical system B can be detected through another common transfer line indicated by the arrow BL. If noises are mixed with the signals in the transfer lines, these noises are the same between the two transfer lines and are cancelled at the comparison stage. Consequently, the first embodiment of the present invention is capable of eliminating influences due to S/N ratios of the transfer lines and enhancing focus detecting accuracy unlike the conventional focus detecting device.

FIG. 13 through FIG. 16 illustrate the second embodiment of the focus detecting device according to the present invention. The second embodiment comprises a focus detecting optical system (hereinafter referred to as a focus detecting optical system A) composed of a condenser lens 3 which is disposed in the vicinity of a predetermined image surface 2 of a photographic lens system, a reimaging lens 11 which is disposed after the condenser lens 3, a pair of reflecting surfaces 12 which are disposed on a plane including a center of curvature of the surface of the reimaging lens 11 with a spacing sufficient for obtaining a required focus detecting accuracy and disposed so as to lead an incident light bundle to a pair of photoelectric converter element arrays 13, and the photoelectric converter element arrays 13; and another focus detecting optical system (hereinafter referred to as a focus detecting optical system B) composed of a pair of reflecting surfaces 14 which are disposed on a plane including a center of curvature of a surface of the reimaging lens 11 with a spacing sufficient for obtaining a required focus detecting accuracy and arranged so as to lead an incident light bundle to a pair of photoelectric converter element arrays 15, and the photoelectric converter element arrays 15 which are disposed in parallel with each other at a location onto which a light bundle emerging from the reimaging lens 11 is to be imaged.

In the focus detecting optical system A, a light bundle which was incident from the photographic lens system and has passed through the predetermined image surface 2 transmits through the condenser lens 3 and is incident on the surface of the reimaging lens 11. The light bundle incident on the reimaging lens 11 is reflected by the pair of the reflecting surfaces 12. These reflecting surfaces have functions which are equivalent to those of aperture stops and determine diameters of light bundles to be incident on the photoelectric converter element arrays 13. The light bundles reflected by the reflecting surfaces 12 emerge from the surface of the reimaging lens 11 and form a pair of secondary images $A_{11}$ and $A_{12}$ on the photoelectric converter element arrays 13. In the focus detecting optical system B, a light bundle which was incident from the photographic lens system and has passed through the predetermined image surface 2 transmits through the condenser lens 3, and is incident on the surface of the reimaging lens 11 and reflected by the pair of the reflecting surfaces disposed on the reimaging lens 11. These reflecting surfaces have functions equivalent to those of aperture stops and determine diameters of light bundles to be incident on the photoelectric converter element arrays 15. The light bundles which have been reflected by the reflecting surfaces emerge from the surface of the reimaging lens 11 and form a pair of secondary images $B_{11}$ and $B_{12}$ on the photoelectric converter element arrays 15. The second embodiment is configured so that centers $A_{11}$ O, $A_{12}$ O, $B_{11}$ O and $B_{12}$ O are coincident with centers of the photoelectric converter element arrays 13 and 15 in a focused condition.

In the second embodiment wherein the reflecting surfaces 12 and 15 disposed on the reimaging lens 11 reflect the light bundles to be incident on the focus detecting optical systems, it is possible to dispose the photoelectric converter element arrays 13 and 15 as illustrated in FIG. 15. Since the reflecting surfaces 12 and 14 are disposed on the plane including the center of curvature of the surface of the reimaging lens 11, the pair of light bundles which are reflected by the reflecting surfaces are reflected in the same manner and the same in aberration conditions, thereby constituting no hindrance to detection of a focused condition by detecting positional deviation between these two light bundles. Out of the electrical signals obtained with the photoelectric converter element arrays 13 and 15, the electrical signals detected by the focus detecting optical system A can be detected through a common transfer line indicated by the arrow AL and the electrical signals detected by the focus detecting optical system B can be detected through another common transfer line indicated by the arrow BL shown in FIG. 16. Therefore, the second embodiment can eliminate influence due to a difference in the S/N ratio between the transfer lines and enhance focus detecting accuracy unlike the conventional focus detecting device. The second embodiment permits using transfer lines which are shorter than those used in the first embodiment and obtain higher S/N ratios of the transfer lines. In addition, the focus detecting optical system A has a defocus range wider than that of the focus detecting optical system B, and the focus detecting optical system B has a focus detecting accuracy higher than that of the focus detecting optical system A.

Figure 18:
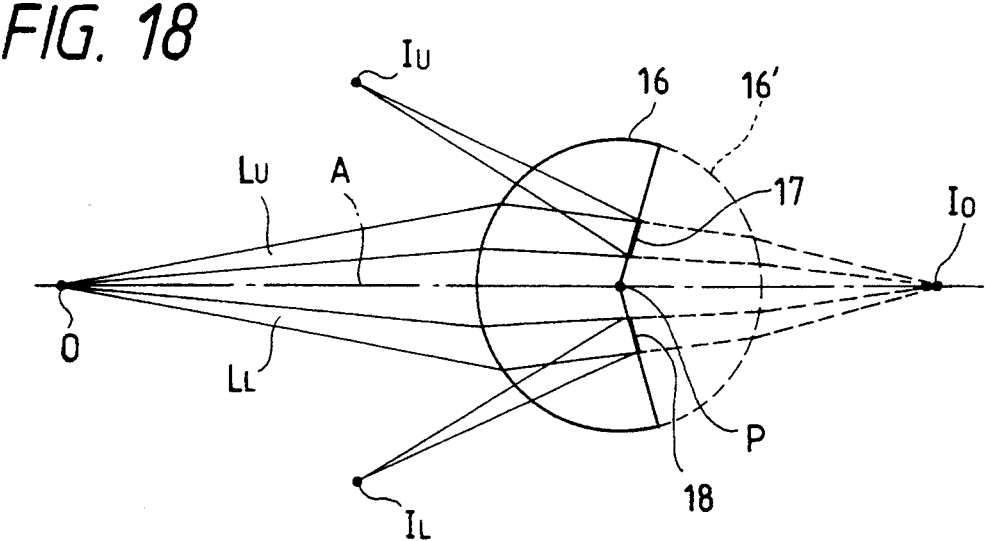
FIG. 18 is a diagram illustrative of the function of a reimaging lens used in the third embodiment of the present invention.
Figure 19:
FIG. 19 is a diagram illustrating a disposition of photoelectric converter element arrays in the third embodiment of the present invention.

FIG. 17 through FIG. 19 illustrates the third embodiment of the focus detecting device according to the present invention. The focus detecting device preferred as the third embodiment is composed of a condenser lens 3 which is disposed in the vicinity of a predetermined image surface 2 of a photographic lens system 1, a reimaging lens 16 which is disposed after the condenser lens 3, a pair of reflecting surfaces 17 and 18 of a focus detecting optical system which are disposed on a plane including a center of curvature of the reimaging lens 16 with a spacing sufficient for obtaining a required focus detecting accuracy and arranged so as to lead light bundles to a pair of photoelectric converter element arrays 19 and 20, which are disposed in a row at locations at which light bundles emerging from the reimaging lens 16 are to be imaged (the photoelectric converter element arrays 19 and 20 are overlapped with each other in FIG. 17). In the third embodiment, a light bundle which has emerged from the photographic lens system 1 and passed through the predetermined image surface 2 of the photographic lens system 1 is allowed to transmit through the condenser lens 3 and incident on the reimaging lens 16 and reflected by the pair of reflecting surfaces 17 and 18 disposed on the rears of the surfaces of incidence of the reimaging lens 16, and the reflected light bundles emerge from the reimaging lens 16. A light bundle reflected by the reflecting surface 17 is reimaged on the photoelectric converter element array 19, whereas a light bundle reflected by the reflecting surface 18 is reimaged on the photoelectric converter element array 20. Though the reflecting surfaces 17 and 18 are directed in the same direction and overlapped with each other in FIG. 17, these reflecting surfaces are actually disposed in different directions as illustrated in FIG. 18.

A function of the reimaging lens 16 will be described detailedly with reference to FIG. 18. In FIG. 18, an imaginary reimaging lens 16' traced in the dashed line has curvature and a radius of curvature which are the same as those of the reimaging lens 16. Therefore, a sphere having a center P is composed by adding these two reimaging lenses to each other. On an assumption of this sphere, a light bundle $L_U$ and another light bundle $L_L$ which are symmetrical with an optical axis connecting an object point O to the center of the sphere are subjected to symmetrical refracting actions and are imaged onto a focal point $I_O$. Assuming that the light bundle $L_U$ is reflected by the reflecting surface 17, which is disposed on a plane including the center of the sphere P, the light bundle $L_U$ is subjected to a refracting action of a spherical lens and is imaged onto a point $I_U$ regardless of an angle of the plane including the center of the sphere P. Similarly, the light bundle $L_L$ is reflected by the reflecting surface 18 and imaged onto a point $I_L$. In this case, imaging conditions (aberrations) are the same between the point $I_U$ and the point $I_L$. In this case, the effect remains the same whether the reimaging lens 16 is made of a homogeneous material or a graded refractive index type material having a refractive index varying in the radial direction from the sphere center P. Though an intersecting line between the planes including the two reflecting surfaces 17 and 18 is perpendicular to the optical axis A and an angle formed between these planes is larger than 180° on the side of incidence of the light bundles in FIG. 18, the effect remains the same even when the angle is smaller than 180°, the intersecting line is not perpendicular to the optical axis A or the reflecting surfaces 17 and 18 are not symmetrical with regard to the optical axis A. Further, the third embodiment is applicable to focus detection within a broad range of detection with substantially no problem so far as the angle formed between the pair of the planes, including the reflecting surfaces 17 and 18, which is close to 180° even when the reimaging lens is an aspherical lens or made of a material having a refractive index distribution or when the pair of planes including the reflecting surfaces are slightly deviated from the center of the sphere. Furthermore, the reflecting surfaces 17 and 18 can have functions of aperture stops since diameters of the light bundles to be incident on the photoelectric converter element arrays are determined dependently on reflecting areas of the reflecting surfaces 17 and 18. Moreover, since the reflecting surfaces 17 and 18 can functions as low pass filters when these surfaces have diffusing properties by coarsening the surfaces thereof, it is possible, without lowering the contrast of the frequency components required for focus detection, to lower the contrast of the specific spatial frequency components producing aliasing, thereby preventing aliasing and enabling focus detection with high accuracy.

Figure 20:
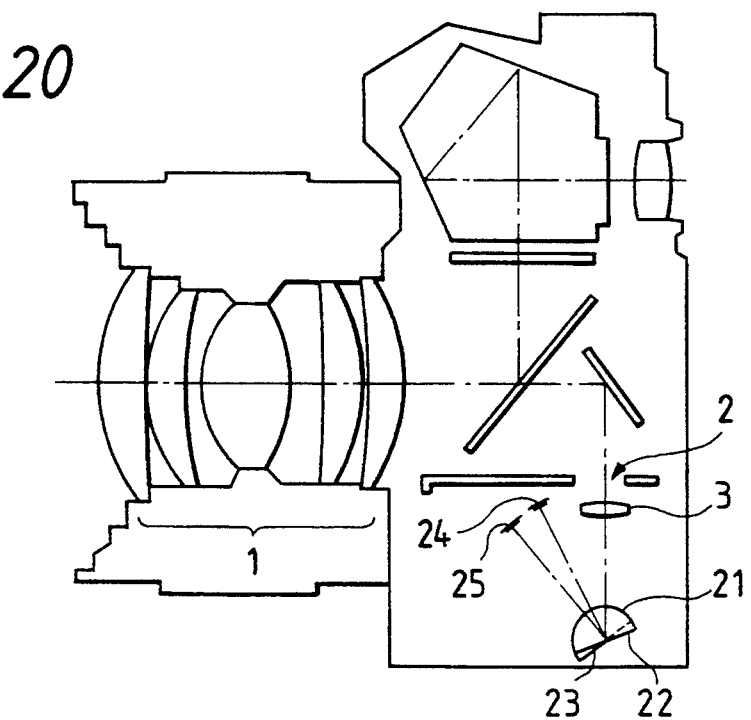
FIG. 20 is a schematic sectional view of a single lens reflex camera illustrating a fourth embodiment of the focus detecting device according to the present invention.
Figure 21:
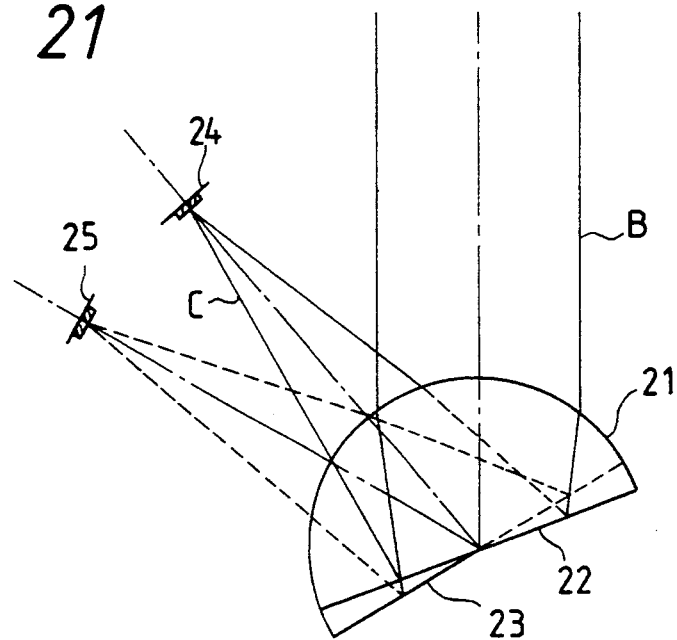
FIG. 21 is a diagram illustrative of the function of a reimaging lens in the fourth embodiment of the present invention.
Figure 22:
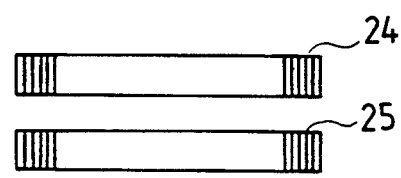
FIG. 22 is a diagram illustrating a disposition of the photoelectric converter element arrays in the fourth embodiment of the present invention.

FIG. 20 through FIG. 22 illustrate the fourth embodiment of the focus detecting device according to the present invention. The fourth embodiment comprises a condenser lens 3 which is disposed in the vicinity of a predetermined image surface 2 of a photographic lens system 1, a reimaging lens 21 disposed after the condenser lens 3, a pair of reflecting surfaces 22 and 23 which are located on a plane including a center of curvature of the reimaging lens 21 with a spacing sufficient for obtaining a required focus detecting accuracy and arranged so as to lead light bundles to a pair of photoelectric converter element arrays 24 and 25, and the pair of photoelectric converter element arrays disposed at locations onto which light bundles emerging from the reimaging lens 21 are to be imaged. In the fourth embodiment, a light bundle which has passed through the photographic lens system 1 and the predetermined image surface 2 thereof is allowed to transmit through the condenser lens 3, incident on the reimaging lens 21, and is reflected by the pair of the reflecting surfaces 22 and 23, and emerges from the reimaging lens 21. A light bundle reflected by the reflecting surface 22 is reimaged onto the photoelectric converter element array 24, whereas another light bundle reflected by the reflecting surface 23 is reimaged onto the photoelectric converter element array 25. The reflecting surfaces 22 and 23 are disposed on planes which are perpendicular to the paper surface but oriented in different directions as illustrated in FIG. 21. This disposition of the reflecting surfaces makes it possible to arrange the reimaging lens and the photoelectric converter elements in compact spaces, to lengthen the arrays of the photoelectric converter elements, and to enhance focus detecting accuracy and broaden defocus detecting ranges.

Figure 23:
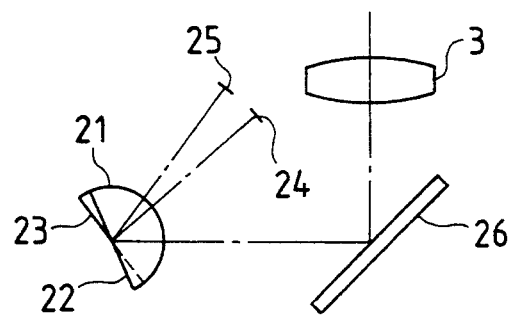
FIG. 23 is a diagram illustrating a fifth embodiment of the focus detecting device according to the present invention.

FIG. 23 illustrates the fifth embodiment of the focus detecting device according to the present invention. The fifth embodiment is different from the fourth embodiment in that the former comprises a reflecting mirror 26 which is disposed between a condenser lens 3 and a reimaging lens 21 so as to perpendicularly refract a light bundle, and permits configuring the focus detecting device to be more compact.

Figure 24:
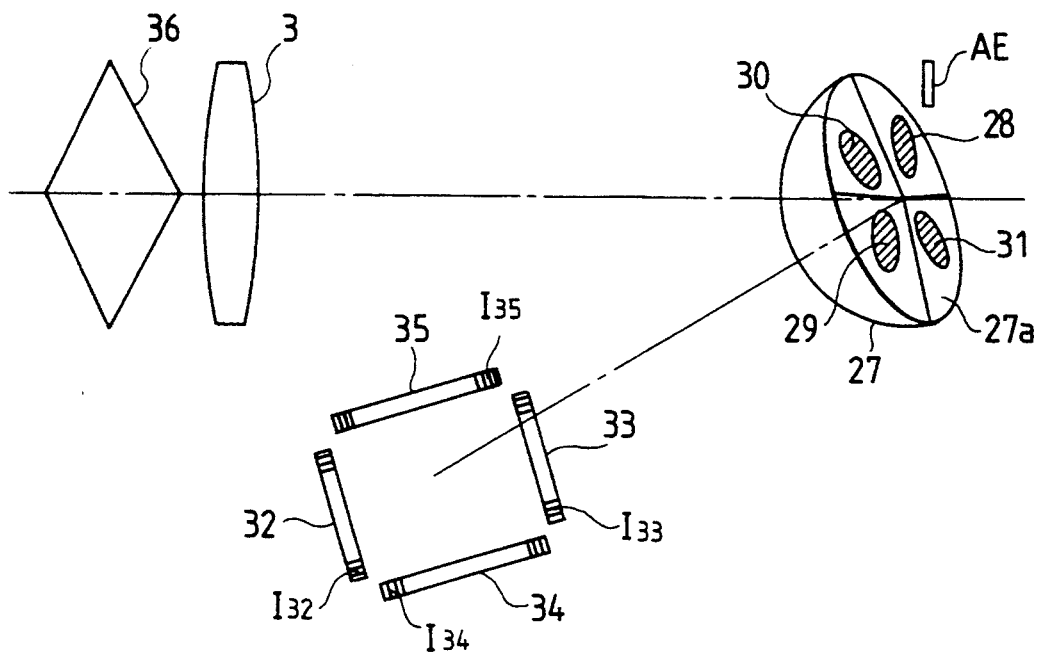
FIG. 24 is a diagram illustrating a sixth embodiment of the focus detecting device according to the present invention.
Figure 25:
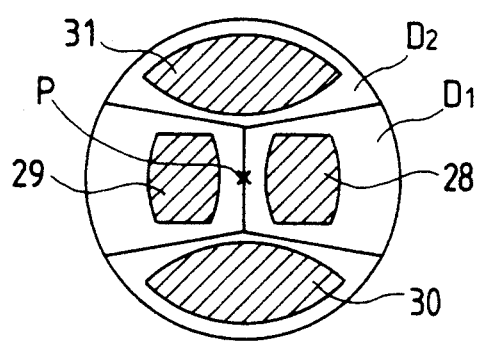
FIG. 25 is a front view illustrating a disposition of reflecting surfaces of a reimaging lens used in the sixth embodiment of the present invention.
Figure 26:
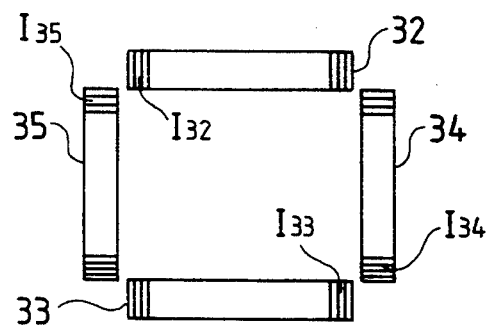
FIG. 26 is a diagram exemplifying a disposition of two pairs of photoelectric converter element arrays in the sixth embodiment of the present invention.

FIG. 24 through FIG. 26 illustrate the sixth embodiment of the focus detecting device according to the present invention. The sixth embodiment comprises a condenser lens 3 which is disposed in the vicinity of a predetermined image surface 2 of a photographic lens system 1, a reimaging lens 27 disposed after the condenser lens 3, reflecting surfaces 28 and 29 of a focus detecting optical system D, which are disposed on a plane including a center of curvature of the reimaging lens 27 and arranged so as to lead light bundles to a pair of photoelectric converter element arrays 32 and 33, reflecting surfaces 30 and 31 of another focus detecting optical system $D_2$ which are disposed on a plane including a center of curvature of the reimaging lens 27 and arranged to lead light bundles to a pair of photoelectric converter element arrays 34 and 35. The photoelectric converter element arrays 32 and 33 of the focus detecting optical system $D_1$ are disposed in parallel with each other at locations onto which light beams emerging from the reimaging lens 27 are to be imaged. Additionally, the photoelectric converter element arrays 34 and 35 of the focus detecting optical system $D_2$ are also disposed in parallel with each other.

In the focus detecting optical system $D_1$, a light bundle which has emerged from the photographic lens system 1 and passed through a field stop 36 disposed in the vicinity of the predetermined image surface 2 transmits through the condenser lens 3 and is incident on a surface of the reimaging lens 27. This light bundle is reflected by the pair of reflecting surfaces 28 and 29 which have functions equivalent to those of aperture stops and determine diameters of light bundles to be incident on the photoelectric converter element arrays 32 and 33. The reflected light bundles emerge from the reimaging lens 27, and form a pair of secondary images $I_{32}$ and $I_{33}$ on the photoelectric converter element arrays 32 and 33 respectively. Since the reflecting surfaces 28 and 29 are disposed on the plane including the center of curvature of the lens surfaces, the pair of the light bundles are subjected to the same condensing action. In the focus detecting optical system $D_2$ also, a light bundle which has emerged from the photographic lens system 1 and passed through the predetermined image surface 2 transmits through the condenser lens 3, falls on the surface of the reimaging lens 27 and is reflected by the pair of reflecting surfaces 30 and 31. These reflecting surfaces have functions which are the same as those of aperture stops and determine diameters of light bundles to be incident on the photoelectric converter element arrays 34 and 35. The reflected light bundles emerge from the reimaging lens 27, and form a pair of secondary images $I_{34}$ and $I_{35}$ on the photoelectric converter element arrays 34 and 35. Since the reflecting surfaces 30 and 31 are disposed on a plane including the center of curvature of the reimaging lens also in this case, the pair of the light bundles are subjected to the same condensing action. In the sixth embodiment, the focus detecting optical system $D_1$ can measure defocus within a range which is broader than that of the focus detecting optical system $D_2$, and the latter has a focus detecting accuracy higher than that of the former.

The sixth embodiment permits making cameras and the similar optical instruments compacter when an automatic exposure control system AE using, for example, sensors for flash light adjustment is disposed after a transmitting section 27a of the reimaging lens 27.

Figure 27:
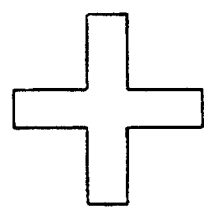
FIG. 27 is a diagram exemplifying a shape of a field stop used in the sixth embodiment of the present invention.
Figure 28:
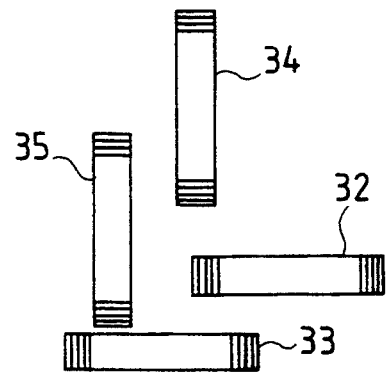
FIG. 28 is a diagram illustrating another example of the disposition of the two pairs of photoelectric converter element arrays in the sixth embodiment of the present invention.
Figure 29:
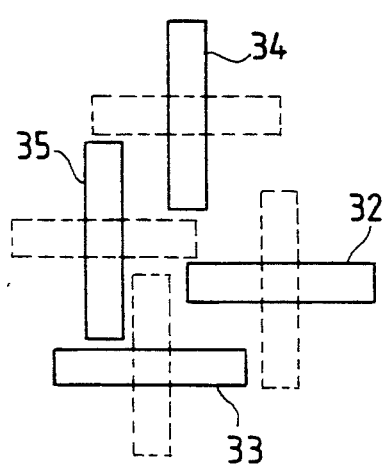
FIG. 29 is a diagram illustrating a still another example of the disposition of the two pairs of photoelectric converter element arrays in the sixth embodiment of the present invention.
Figure 30:
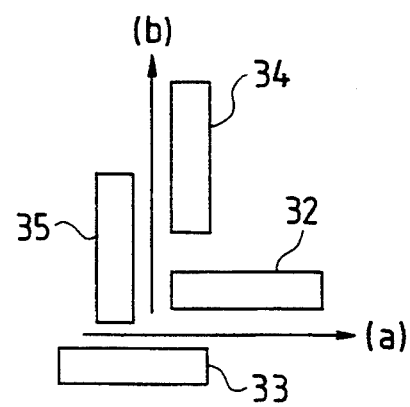
FIG. 30 is a diagram illustrating a pattern of signal transfer lines for the photoelectric converter element arrays in the sixth embodiment of the present invention.
Figure 31:
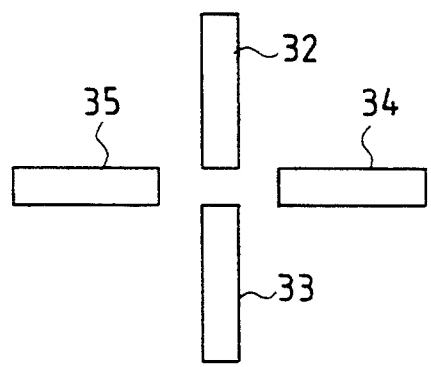
FIG. 31 is a diagram illustrating a further example of the disposition of the two pairs of photoelectric converter element arrays in the sixth embodiment of the present invention.
Figure 32:
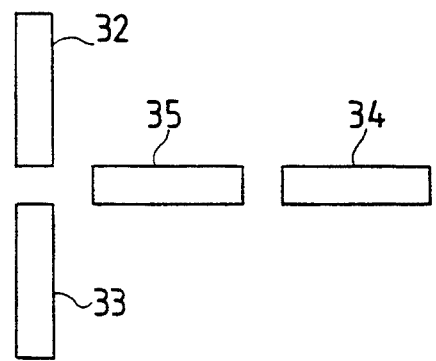
FIG. 32 is a diagram illustrating a still further example of the disposition of the two pairs of photoelectric converter element arrays in the sixth embodiment of the present invention.

Further, it is desirable that the field stops have shapes which are configured so as to allow to pass only the light bundles to be incident on the photoelectric converter element arrays as shown in FIG. 27. When the field stops are configured as described above, it is possible to dispose the photoelectric converter element arrays compactly as shown in FIG. 28. FIG. 29 shows ranges of the light bundles incident on the surfaces of the photoelectric converter element arrays disposed as illustrated in FIG. 28. When the photoelectric converter element arrays are disposed as described above, it is possible to read out signals from the photoelectric converter element arrays through the transfer lines laid out as shown in FIG. 30 and easily obtain data with high S/N ratios. In FIG. 30, the arrows (a) and (b) indicate signal call-out lines of the focus detecting optical systems $D_1$ and $D_2$ respectively. The photoelectric converter element arrays may be laid out as shown in FIG. 31 or FIG. 32.

Figure 33A:
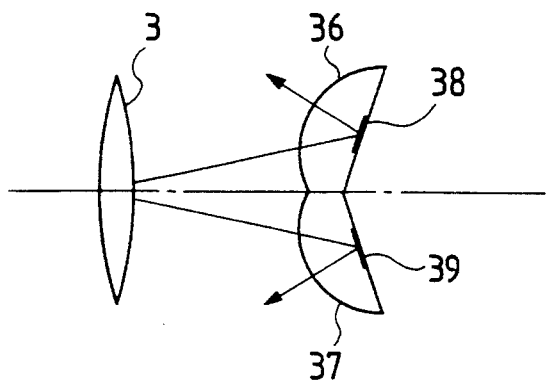
FIG. 33A is a side view illustrating a disposition of the photoelectric converter element arrays in a seventh embodiment of the focus detecting device according to the present invention.
Figure 33B:
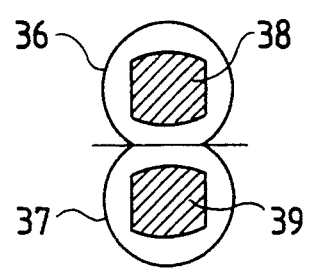
FIG. 33B is a front view illustrating the disposition of the photoelectric converter element arrays shown in FIG. 33A.

FIG. 33A and FIG. 33B illustrate the seventh embodiment of the focus detecting device according to the present invention. The seventh embodiment is different from the embodiments already described above in that the former adopts a pair of reimaging lenses 36 and 37 whose surfaces have radii of curvature different from each other, and reflecting surfaces 38 and 39 are formed on the rears of the reimaging lenses respectively. In the seventh embodiment, the pair of reimaging lenses are formed integrally, and the reflecting surfaces 38 and 39 perform the functions of field stops.

Figure 34A:
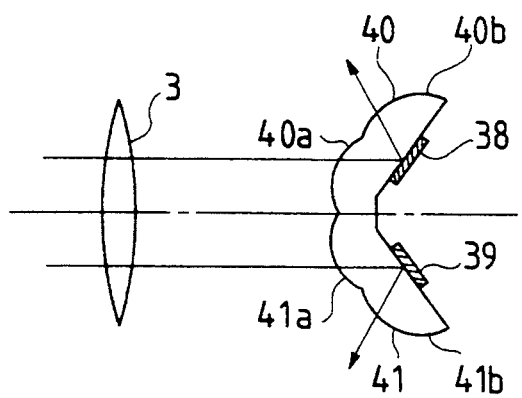
FIG. 34A is a side view illustrating a disposition of photoelectric converter element arrays in an eighth embodiment of the focus detecting device according to the present invention.
Figure 34B:
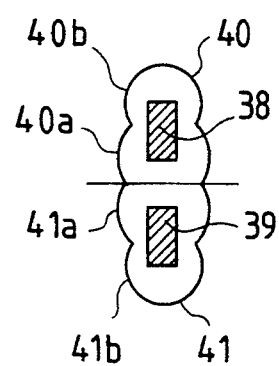
FIG. 34B is a front view illustrating the disposition of the photoelectric converter element arrays shown in FIG. 34A.

FIG. 34A and FIG. 34B illustrate the eighth embodiment of the focus detecting device according to the present invention. The eighth embodiment is different from the seventh embodiment in that a surface of incidence and a surface of emergence have radii of curvature different from each other on a pair of reimaging lenses 40 and 41. This embodiment is configured so that a light bundle incident from a surface of incidence 40a is reflected by a reflecting surface 38 and allowed to emerge from a surface of emergence 40b which has a radius of curvature different from that of the surface of incidence 40a, whereas a light bundle incident from a surface of incidence 41a is reflected by a reflecting surface 39 and allowed to emerge from a surface of emergence 41b which has a radius of curvature different from that of the surface of incidence 41a. The eighth embodiment also adopts the reimaging lenses 40 and 41 which are formed integrally, and permits, like the seventh embodiment, manufacturing the lenses and the reflecting surfaces with the same precision, thereby forming a compact focus detecting device featuring high detecting accuracy.

What is claimed is:

1. A focus detecting device comprising:
a photographic lens system having at least one image surface;
a plurality of focus detecting optical systems each having photoelectric converter means for receiving a pair of light bundles having passed through different regions of said photographic lens system, said photoelectric means having light receiving surfaces for receiving said light bundles,
said focus detecting optical systems each being operable to detect a phase difference between two light bundles comprising a respective pair of light bundles as a function of light intensity distributions on said light receiving surfaces;
said light bundles being spatially separated from one another on said light receiving surfaces, and at least partially overlapping one another on said at least one image surface of said photographic lens system;
wherein an imaginary line extending between the light receiving surfaces of the photoelectric means of one of said focus detecting optical systems does not intersect with another imaginary line extending between said light receiving surfaces of the photoelectric converter means of another of said focus detecting optical systems.

2. A focus detecting device comprising:
a photographic lens system having an image surface;
a plurality of photoelectric converter means each having light receiving surfaces for receiving a respective pair of light bundles having passed through different regions of said photographic lens system and each configured so as to perform focus detection by detecting a phase difference between the light bundles received thereby as a function of light intensity distributions on said light receiving surfaces;
wherein said focus detecting device comprises: a condenser lens disposed in the vicinity of an image surface of said photographic lens system, a reimaging lens disposed on an emergence side of said condenser lens and having a plurality of reflecting surfaces for reflecting said light bundles having passed through said condenser lens in directions different from each other, and wherein each said photoelectric converter means comprises photoelectric converter element arrays for receiving said two light bundles reflected by said reimaging lens.

3. A focus detecting device according to claim 2 wherein said reimaging lens has a surface of incidence and a surface of emergence formed on a continuous curved surface.

4. A focus detecting device according to claim 2 wherein said reimaging lens has a surface of incidence and a surface of emergence formed on a spherical surface having a center of curvature, and said plurality of reflecting surfaces are each formed on a plane including said center of curvature.

5. A focus detecting device according to claim 2 wherein said reimaging lens has a surface of incidence and a surface of emergence formed on an aspherical surface having an axis, and said plurality of reflecting surfaces are each formed on a plane including a center of curvature of a paraxial curved surface of said aspherical surface.

6. A focus detecting device according to claim 2 wherein diameters of the light bundles to be incident on said photoelectric converter means are determined by reflecting areas of the reflecting surfaces of said reimaging lens.

7. A focus detecting device according to claim 2 wherein the reflecting surfaces of said reimaging lens are formed as coarse surfaces for diffusing light.

8. A focus detecting device comprising:
a photographic lens system having an image surface;
a plurality of focus detecting optical systems each having photoelectric converter means for receiving a pair of light bundles having passed through different regions of said photographic lens system, said photoelectric means having light receiving surfaces for receiving said light bundles,
said focus detecting optical systems each being operable to detect a phase difference between two light bundles comprising a respective pair of light bundles as a function of light intensity distributions on said light receiving surfaces,
said light bundles being spatially separated from one another as they are detected by the focus detecting optical systems;
wherein said focus detecting device comprises: (i) a condenser lens disposed in the vicinity of said image surface of said photographic lens system, said condenser lens being adapted to permit each said pair of light bundles to pass therethrough in different directions, (ii) a reimaging lens disposed on an emergence side of said condenser lens and having a plurality of reflecting surfaces for reflecting said light bundles passing through said condenser lens in different directions, and wherein each photoelectric converter means comprises two photoelectric converter element arrays.

* * * * *